(12) United States Patent
Fujimoto et al.

(10) Patent No.: US 6,790,576 B2
(45) Date of Patent: Sep. 14, 2004

(54) DISPERSING AGENT FOR PIGMENT, PIGMENT-DISPERSION COMPOSITION, TONER, AND TONER PRODUCTION PROCESS

(75) Inventors: Norikazu Fujimoto, Shizuoka (JP); Hitoshi Itabashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 10/339,524

(22) Filed: Jan. 10, 2003

(65) Prior Publication Data

US 2003/0181551 A1 Sep. 25, 2003

(30) Foreign Application Priority Data

Jan. 17, 2002 (JP) .......................................... 2002-008536
Dec. 20, 2002 (JP) .......................................... 2002-370047

(51) Int. Cl.$^7$ ................................................. G03G 9/08
(52) U.S. Cl. ............................. 430/108.21; 430/108.2; 430/137.15; 524/105; 540/129
(58) Field of Search ......................... 430/108.21, 108.2, 430/137.15; 524/105; 540/129

(56) References Cited

U.S. PATENT DOCUMENTS 5,494,511 A 2/1996 Holbrook ..................... 106/401

FOREIGN PATENT DOCUMENTS

| JP | 6-122835 | 5/1994 |
| JP | 9-5989 | 1/1997 |
| JP | 2002-302993 | 10/2000 |
| JP | 2002 514263 | 5/2002 |
| JP | 2002-226727 | 8/2002 |
| WO | WO 99/01511 | 1/1999 |

*Primary Examiner*—Mark A. Chapman
(74) *Attorney, Agent, or Firm*—Fitzpatrick, Cella, Harper & Scinto

(57) ABSTRACT

It is an object of the present invention to provide a dispersing agent for a pigment capable of finely dispersing a pigment in a dispersion medium. The present invention provides a dispersing agent for a pigment comprising at least a metallic compound having a specific structure with a central metal capable of taking a penta-coordinated structure, and n-electron-donating compound having affinity for the dispersion medium and capable of being coordinated with the central metal of the metallic compound.

18 Claims, No Drawings

DISPERSING AGENT FOR PIGMENT, PIGMENT-DISPERSION COMPOSITION, TONER, AND TONER PRODUCTION PROCESS

BACKGROUND OF THE INVENTION

Field of the Invention and Related Background Art

The present invention relates to a dispersing agent for a pigment (hereinafter often "pigment-dispersing agent") which is to improve dispersibility of pigments, and a pigment-dispersion composition incorporating the same. The present invention also relates to a toner for developing electrostatic images for image-forming methods, e.g., electrophotography and electrostatic printing, or for forming toner images in a toner-jet type image-forming method, and to a process for producing the same. In particular, the present invention relates to a toner for fixing images formed by the toner on a transfer medium under heating and pressure, and to a process for producing the same.

In processes for producing products, e.g., coating material, ink, toner and formed resin article, a pigment-dispersing agent has been effectively utilized as an additive for finely dividing a pigment and thereby sufficiently realizing its colorant performances (e.g., coloring capacity, transparency and gloss).

A pigment-dispersing agent should satisfy various requirements to fully exhibit its functions, e.g., chemical structure which fast adsorbs a pigment in the molecule, affinity for a solvent and resin which are used to disperse the pigment, and chemical structure which provides steric hindrance to prevent re-agglomeration of the pigment. A phthalocyanine-based pigment and carbon black incorporate a phthalocyanine-based colorant derivative. One type of known pigment-dispersing agents is prepared by mixing a material which can adsorb a pigment with a resin which has affinity for the solvent and resin and can provide steric hindrance, and bonding them to each other by acid-base interactions, in order to make the pigment commonly applicable to a variety of solvents and resins (disclosed in, e.g., Japanese Patent Application Laid-Open No. 06-122835, Japanese Patent Application No. 09-5989 and National Publication No. 2002-514263).

However, when such a two-component pigment-dispersing agent is used, it is necessary to prepare it under conditions which cause no scission of the bond of acidic and basic groups bonding them to each other, and to keep these conditions. When a pigment is dispersed in an aqueous solvent, in particular, sufficient care must be taken for a solvent pH level and a functional group of the resin to be incorporated. Even when they are dissociated from each other, dispersed conditions can be kept to some extent by the actions of a polar group of the phthalocyanine derivative. However, this may cause problems, e.g., re-agglomeration of the pigment or floating of the pigment in the presence of the polar group in the subsequent steps, e.g., drying, molding and polymerization.

Toners for printers and copying machines are composed of toner particles with a binder resin, colorant (e.g., magnetic particles, carbon black, dye or pigment) and wax as the main ingredients, and the toner particles generally have a weight-average particle diameter of 4 to 20 $\mu$m. In general, the toner particles are prepared by melting a mixture of a thermoplastic resin and a colorant to uniformly disperse the colorant in the resin, finely dividing the mixture after it is cooled, and classifying the resultant particles to produce particles of a desired particle diameter. The colorant is uniformly dispersed in the thermoplastic resin by, e.g., kneading or flushing, where a pigment-dispersing agent is expected to increase dispersibility of the pigment, when mixed with the colorant and the thermoplastic resin. However, the pigment-dispersing agent may adversely affect electrification characteristics of the toner particles, because it must be incorporated at 20 to 50% by weight based on the pigment.

Suspension polymerization, which involves no crushing of particles, is proposed for production of toner particles (disclosed in, e.g., Japanese Patent Application Laid-Open No. 05-197193). This process comprises the steps of dissolving or dispersing a colorant, charge control agent and wax in a polymerizable monomer to prepare a polymerizable monomer composition; dispersing the composition in an aqueous solvent containing a dispersion stabilizer with a dispersion apparatus to form polymerizable monomer composition particles in the aqueous solvent; and polymerizing and solidifying the polymerizable monomer in the polymerizable monomer composition to produce toner particles of intended particle diameter and composition. This process, involving no particle crushing step, is expected to bring favorable effects, e.g., energy saving, improved process yield and reduced cost. However, the pigment particles, even when finely dispersed in the polymerizable monomer, may re-agglomerate with each other in the polymerization step, to possibly deteriorate colorant capacity and transparency of the fixed images. Use of a pigment-dispersing agent for the process is considered. However, it tends to adversely affect electrification characteristics of the toner particles, because it must be incorporated at 20 to 50% by weight based on the pigment.

One of the pigment-dispersing agents proposed to solve the above problems has a pigment-adsorbing segment covalently bonded, to a resin material segment which has affinity for the solvent and resin and provides steric hindrance (disclosed in, e.g., Japanese Patent Application Laid-Open No. 2002-226727). When a compound in which a Cu-phthalocyanine skeleton is grafted in a polymer is employed as a dispersing agent, it can exhibit the dispersion effect even in a trace quantity in the pigment, and successfully prevents re-agglomeration of the pigment particles in the polymerization step and keeps electrification characteristics of the toner. However, production of such a pigment-dispersing agent needs a multi-staged synthesis route. Therefore, there are great demands for pigment-dispersing agents which can be produced in high productivity.

Incorporation of Zn-phthalocyanine is also proposed to control a color tone of a cyan pigment (disclosed in, e.g., Japanese Patent Application Laid-Open No. 2000-302993). However, Zn-phthalocyanine, when present alone, can neither prevent re-agglomeration of pigment particles nor improve their affinity for a dispersion medium, even when it is adsorbed on the pigment particle surface. Accordingly, it will bring no effect of dispersing the pigment. Japanese Patent Application Laid-Open No. 2000-302993 also describes that a dispersing agent is incorporated preferably at 5 to 80% by weight based on a pigment. However, pigment-dispersing agents exhibiting the effect in a smaller quantity are in demand.

SUMMARY OF THE INVENTION

It is an object of the present invention to provide a dispersing agent for a pigment free of the above problems.

It is another object of the present invention to provide a dispersing agent for a pigment capable of finely dispersing, in a smaller quantity, pigment particles in a dispersion medium.

It is another object of the present invention to provide an inexpensive dispersing agent for a pigment not involving a multi-staged synthesis route.

It is still another object of the present invention to provide a pigment-dispersion composition capable of keeping pigment particles stably dispersed in various production steps after the pigment is incorporated in the raw material.

It is still another object of the present invention to provide a toner in which a pigment can be finely dispersed in the toner particles and which is excellent in coloring capacity and transparency, and a process for producing the same.

It is still another object of the present invention to provide a toner free of colorant floating on a toner particle surface and excellent in electrification characteristics and environmental stability, and a process for producing the same.

The present invention relates to a dispersing agent for a pigment comprising at least a metallic compound having a structure represented by the general formula (I):

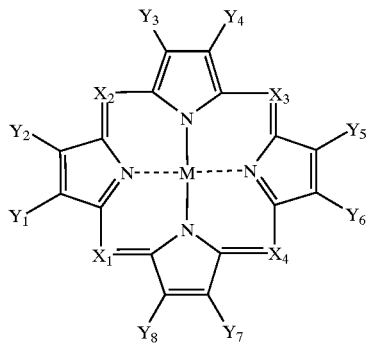

(I)

(wherein, $X_1$ to $X_4$ are each independently a nitrogen atom or C—R (R is a hydrogen atom, or an alkyl group of 1 to 12 carbon atoms, which may have a substituent, or an aromatic hydrocarbon group, which may be substituted); $Y_1$ to $Y_8$ are each independently a hydrogen atom or an alkyl group of 1 to 12 carbon atoms, which may be substituted; or $Y_1$ and $Y_2$, $Y_3$ and $Y_4$, $Y_5$ and $Y_6$ and/or $Y_7$ and $Y_8$ constitute an aromatic hydrocarbon ring which may have a substituent; and M is a metal capable of taking a penta-coordinated structure) and an n-electron-donating compound capable of being coordinated with the central metal of the metallic compound.

The present invention also relates to a pigment-dispersion composition comprising at least a dispersing agent for a pigment which comprises at least a metallic compound having a structure represented by the general formula (I):

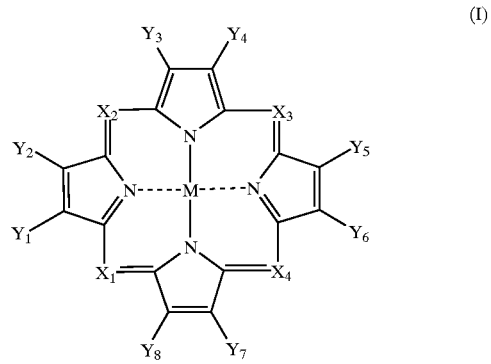

(I)

(wherein, $X_1$ to $X_4$ are each independently a nitrogen atom or C—R (R is hydrogen atom, or an alkyl group of 1 to 12 carbon atoms, which may have a substituent, or an aromatic hydrocarbon group, which may be substituted); $Y_1$ to $Y_8$ are each independently a hydrogen atom or an alkyl group of 1 to 12 carbon atoms, which may be substituted; or $Y_1$ and $Y_2$, $Y_3$ and $Y_4$, $Y_5$ and $Y_6$ and/or $Y_7$ and $Y_8$ constitute an aromatic hydrocarbon ring which may have a substituent; and M is a metal capable of taking a penta-coordinated structure) and an n-electron-donating compound capable of being coordinated with the central metal of the metallic compound, a pigment, and a dispersion medium.

The present invention also relates to a toner containing toner particles comprising at least a dispersing agent for a pigment which comprises at least a metallic compound having a structure represented by the general formula (I):

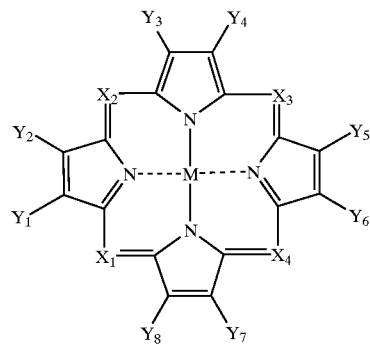

(I)

(wherein, $X_1$ to $X_4$ are each independently a nitrogen atom or C—R (R is hydrogen atom, or an alkyl group of 1 to 12 carbon atoms, which may have a substituent, or an aromatic hydrocarbon group, which may be substituted); $Y_1$ to $Y_8$ are each independently a hydrogen atom or an alkyl group of 1 to 12 carbon atoms, which may be substituted; or $Y_1$ and $Y_2$, $Y_3$ and $Y_4$, $Y_5$ and $Y_6$ and/or $Y_7$ and $Y_8$ constitute an aromatic hydrocarbon ring which may have a substituent; and M is a metal capable of taking a penta-coordinated structure) and an n-electron-donating compound capable of being coordinated with the central metal of the metallic compound, a pigment, and a binder resin.

The present invention also relates to a process for producing a toner comprising a step of mixing a dispersing agent for a pigment which comprises at least a metallic compound having a structure represented by the general formula (I):

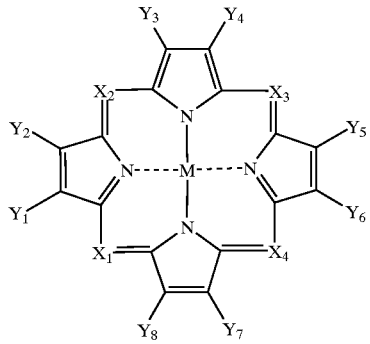

(wherein, $X_1$ to $X_4$ are each independently a nitrogen atom or C—R (R is hydrogen atom, or an alkyl group of 1 to 12 carbon atoms, which may have a substituent, or an aromatic hydrocarbon group, which may be substituted); $Y_1$ to $Y_8$ are each independently a hydrogen atom or an alkyl group of 1 to 12 carbon atoms, which may be substituted; or $Y_1$ and $Y_2$, $Y_3$ and $Y_4$, $Y_5$ and $Y_6$ and/or $Y_7$ and $Y_8$ constitute an aromatic hydrocarbon ring which may have a substituent; and M is a metal capable of taking a penta-coordinated structure) and an n-electron-donating compound capable of being coordinated with the central metal of the metallic compound, and a pigment.

DETAILED DESCRIPTION OF THE PREFERRED EMBODIMENT

The inventors of the present invention have found, after having extensively studied, that a dispersing agent for a pigment comprising a metallic compound of specific structure and a compound capable of being coordination-bonded at the central metal of the metallic compound can easily disperse a pigment finely in a dispersion medium, achieving the present invention.

The pigment-dispersing agent of the present invention can be used in processes for producing products, e.g., coating material, ink, toner and formed resin article, as a pigment-treating agent to improve dispersibility of the pigment. The pigment-dispersing agent of the present invention is characterized by comprising a metallic compound of specific structure which allows the central metal to take a penta-coordinated structure and an n-electron-donating compound capable of being coordinated with the central metal of the metallic compound.

The pigment-dispersing agent of the present invention comprises a metallic compound whose central metal, which is to be adsorbed on the pigment, is coordination-bonded to an n-electron-donating compound having a prevention of re-agglomeration of pigments and a dispersing effect, produced by mixing and dispersing these components. The n-electron-donating compound, which can work as a ligand, has affinity for the dispersion medium to produce an excellent dispersion effect.

The metallic compound has a structure represented by the general formula (I):

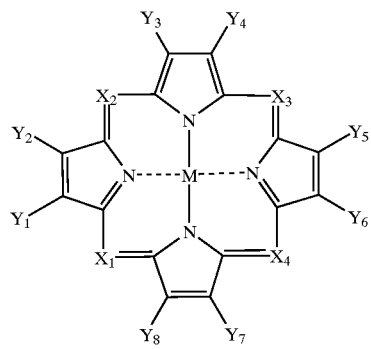

(wherein, $X_1$ to $X_4$ are each independently a nitrogen atom or C—R (R is hydrogen atom, or an alkyl group of 1 to 12 carbon atoms, which may have a substituent, or an aromatic hydrocarbon group, which may be substituted); $Y_1$ to $Y_8$ are each independently a hydrogen atom or an alkyl group of 1 to 12 carbon atoms, which may be substituted; or $Y_1$ and $Y_2$, $Y_3$ and $Y_4$, $Y_5$ and $Y_6$ and/or $Y_7$ and $Y_8$ constitute an aromatic hydrocarbon ring which may have a substituent; and M is a metal capable of taking a penta-coordinated structure).

The substituent is not limited. The examples include those having a carboxylic, sulfonic, aromatic-based, aliphatic-based, ether or alcohol group introduced. However, those hindering adsorptivity with the pigment or easy inclusion of a ligand for coordination in the axial direction are not desirable. Undesirable substituents include functional groups whose amine by itself can become a ligand, and those having a side chain which may cause steric hindrance on the plane on which the pigment is to be adsorbed.

In consideration of adsorptivity with the pigment, the metallic compound preferably has a phthalocyanine skeleton represented by the general formula (I) with $X_1$ to $X_4$ being each independently a nitrogen atom, and each of combinations of $Y_1$ and $Y_2$, $Y_3$ and $Y_4$, $Y_5$ and $Y_6$, and $Y_7$ and $Y_8$ constitutes an aromatic hydrocarbon ring which may have a substituent.

The metal as the central metal M in the metallic compound is aluminum, silicon, titanium, vanadium, chromium, manganese, iron, cobalt, nickel, zinc, germanium, palladium, cadmium, indium, tin, platinum or lead, in consideration of the ligand to be coordinated in the axial direction. The penta-coordinated structure is particularly preferable in a presence of a ligand, because it can be coordination-bonded to the plane on which the pigment is adsorbed. Of the above metals, zinc takes the penta-coordinated structure more easily than the others.

Moreover, of the metallic compounds with zinc as the central metal, zinc-phthalocyanine (Zn-phthalocyanine) represented by the following formula is most preferable, in consideration of its fastness as a pigment-dispersing agent and adsorptivity with a phthalocyanine pigment:

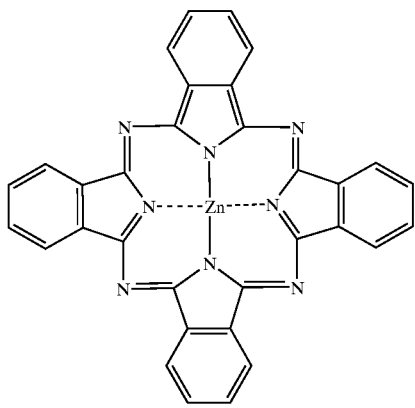 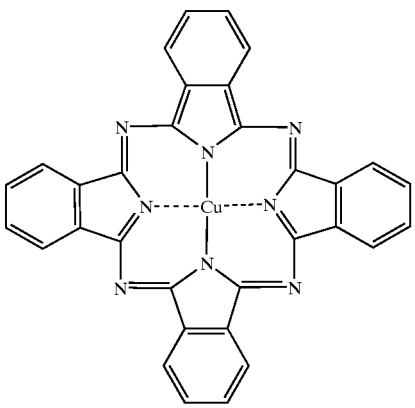

In the present invention, zinc-phthalocyanine is contained as the pigment-adsorbing segment in the pigment-dispersing agent, and can achieve its role at a very low content, sufficiently exhibiting its effect at 5% by weight or less. The effect of adjusting color tone which zinc-phthalocyanine itself has is in a negligible range.

The n-electron-donating compound capable of being coordinated with the central metal of the metallic compound is not limited. The compound having an excellent n-electron-donating property preferably has at least one skeleton selected from the group consisting of primary to tertiary amines, imines, primary to tertiary amides, imides, aromatic imides (e.g., pyridine), thiols, thioesters, thionyl, sulfide and sulfoxide. The unshared electron pair in the nitrogen or sulfur atom in these skeletons shows excellent coordination capacity, and can be easily designed as the ligand.

The n-electron-donating compound is preferably an oligomer or polymer, because of its affinity for the dispersion medium and steric hindrance it provides against the pigment to make it dispersible. The oligomers or polymers useful for the present invention include styrene copolymers of a styrene monomer and an n-electron donative monomer, copolymers of an acrylic monomer and an n-electron donative monomer and copolymers of a methacrylic monomer and an n-electron donative monomer; copolymers of an ester-based monomer and an n-electron donative monomer; copolymers of an ether-based monomer and an n-electron donative monomer; copolymers of a vinyl alcohol monomer and an n-electron donative monomer; and copolymers of a vinyl butyral monomer and an n-electron donative monomer. Moreover, polyurethanes and polypeptides are also useful for the present invention.

The pigment for the present invention may be selected from known ones. In particular, the pigment-dispersing agent of the present invention can be effectively utilized for colored pigments, e.g., phthalocyanine-based pigment, and carbon black.

As phthalocyanine-based pigments, copper-phthalocyanine (Cu-phthalocyanine) represented by the following formula is preferable.

The dispersion medium for the present invention is selected depending on specific purposes of the pigment-dispersion composition, and is not limited. More specifically, the media useful for the present invention include water; alcohols, e.g., methyl alcohol, ethyl alcohol, modified ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol and cyclohexanol; ether alcohols, e.g., methyl cellosolve, cellosolve, isopropyl cellosolve, butyl cellosolve, diethylene glycol and monobutyl ether; ketones, e.g., acetone, methyl-ethylketone and methylisobutylketone; esters, e.g., ethyl acetate, butyl acetate, ethyl propionate and cellosolve acetate; hydrocarbons, e.g., hexane, octane, petroleum-derived ether, cyclohexane, benzene, toluene and xylene; halogenated hydrocarbons, e.g., carbon tetrachloride, trichloroethylene and tetrabromoethane; ethers, e.g., ethyl ether, dimethyl glycol and trioxanetetrahydrofuran; acetals, e.g., methylal and diethyl acetal; organic acids, e.g., formic acid, acetic acid and propionic acid; and organic compounds containing sulfur or nitrogen, e.g., nitropropene, nitrobenzene, dimethylamine, monoethanolamine, pyridine, dimethyl sulfoxide and dimethyl formamide. Moreover, the dispersion medium may be a resin. More specifically, the resins useful for the present invention include polystyrene and styrene copolymer; polyacrylic acid, polymethacrylic acid, polyacrylate, polymethacrylate, acrylate copolymer and methacrylate copolymer; polyester; polyvinyl ether and polyvinyl methyl ether; and polyvinyl alcohol and polyvinyl butyral. Still more, polyurethane and polypeptide are also useful for the present invention. These dispersion media may be used either individually or in combination.

The polymerizable monomer useful as the dispersion medium for the present invention is for addition or condensation polymerization, that for the former being more preferable. More specifically, the polymerizable monomers useful for the present invention include styrene; styrene derivatives, e.g., o-methyl styrene, m-methyl styrene, p-methyl styrene, p-methoxystyrene, p-phenyl styrene, p-chlorostyrene, 3,4-dichlorostyrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene and p-n-dodecyl styrene; ethylenic unsaturated monoolefins, e.g., ethylene, propylene, butylenes and isobutylene; unsaturated polyenes, e.g., butadiene and isoprene; halogenated vinyls, e.g., vinyl chloride, vinylidene chloride, vinyl bromide and vinyl iodide; vinyl esters, e.g., vinyl acetate, vinyl propionate and vinyl benzoate; α-methylene fatty acid/monocarboxylic acid esters, e.g., methyl methacrylate, ethyl methacrylate, propyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylate esters, e.g., methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate and phenyl acrylate; vinyl ethers, e.g., vinyl methyl ether, vinyl ethyl ether and vinyl isobutyl ether; N-vinyl compounds, e.g., vinyl methyl ketone, vinyl hexyl ketone and methyl isopropenyl ketone; vinyl naphthalene; and acrylic acid derivatives, e.g., acrylonitrile, methacrylonitrile and acrylamide.

As described above, the pigment-dispersing agent of the present invention comprises a metallic compound of specific structure, whose central metal can take a penta-coordinated structure, and n-electron-donating compound capable of being coordinated with the central metal of the metallic compound. It can be produced by separately charging the metallic compound and n-electron-donating compound working as the ligand in the dispersion medium, before the pigment is dispersed in the medium by utilizing the coordination bond. This means that the metallic compound segment as the pigment-adsorbing segment and ligand segment for providing dispersibility can be individually prepared, thereby facilitating synthesis of the pigment-dispersing agent of the present invention.

The pigment-dispersion composition of the present invention comprises at least a dispersion medium, pigment and the pigment-dispersing agent of the present invention. In other words, a known pigment and dispersion medium can be suitably used for the pigment-dispersion composition of the present invention.

For the production of the pigment-dispersion composition of the present invention, the pigment-dispersing agent and, as required, a resin are dissolved in a dispersion medium, to which a powdered pigment is added little by little with stirring to be sufficiently compatible with the medium. The pigment-dispersing agent can be adsorbed on the pigment particle surfaces under a mechanical shear force by a disperser, e.g., ball mill, paint shaker, dissolver, attritor, sand mill or high-speed mill, to finely re-disperse the pigment in the form of stably uniform, fine particles in the medium.

The toner of the present invention is for developing electrostatic images, or for forming toner images in a toner-jet type image-forming method. In particular, it is suitable for an image-forming method involving fixation of the toner images on a transfer medium under heating and pressure.

The toner of the present invention is characterized by comprising at least the pigment-dispersing agent of the present invention. The process of the present invention for forming the toner uses the pigment-dispersing agent of the present invention in the pigment dispersing step.

When the toner is produced by a crushing process, the pigment-dispersing agent of the present invention, a pigment, binder resin as the dispersion medium and one or more additives are sufficiently mixed with each other by a mixer, e.g., Henschel mixer or ball mill. The mixture is then melt-kneaded by a kneader operating at elevated temperature, e.g., kneader or extruder, where it is subjected to heat and mechanical shear force to melt the resin. In this stage, the pigment particles are surface-treated with the pigment-dispersing agent and, at the same time, finely dispersed in the molten material. The molten/kneaded mixture is cooled for solidification, and preliminary crushed and then finely pulverized. The resultant fine particles pulverized are classified to obtain the toner particles.

The particles of the toner of the present invention can be produced by a polymerization process involving the polymerization step in which the polymerizable monomer composition, comprising at least a polymerizable monomer for forming the binder resin, pigment and the pigment-dispersing agent of the present invention, is polymerized with the aid of radical polymerization initiator, light or heat, and are especially preferable because they allow the pigment-dispersing agent of the present invention to exhibit its effect more efficiently.

In the process involving suspension polymerization for producing the toner particles, in particular, the pigment-dispersion composition incorporating a polymerizable monomer as the dispersion medium is treated by a disperser, to prepare the pigment-dispersed paste comprising the polymerizable monomer, pigment and pigment-dispersing agent. The resultant paste is further treated by an agitator together with the polymerizable monomer, a polymerization initiator, wax and, as required, one or more other additives to prepare the polymerizable monomer composition in the form of uniform mixture or dispersion. The polymerizable monomer composition thus obtained is incorporated in the dispersion medium (preferably aqueous medium) containing a dispersion stabilizer, and finely dispersed to the toner particle size by an agitator, e.g., high-speed agitator or high-speed disperser, e.g., ultrasonic disperser (granulation step). The toner particles can be produced by polymerizing the polymerizable monomer finely dispersed in the polymerizable monomer composition in polymerization step with the aid of a radical polymerization initiator, light and/or heat.

For production of the toner of the present invention, an additive may be externally added in the toner particles during the production process.

The polymerizable monomer contained in the toner particles to form the binder resin may be the one similar to the polymerizable monomer described above.

The pigment for the toner of the present invention may be selected from known pigments. In particular, a colored pigment, e.g., phthalocyanine-based one or carbon black, is suitable for the present invention. It is incorporated preferably at 3 to 20 parts by weight based on 100 parts by weight of the polymerizable monomer.

The pigment contained in the toner of the present invention is surface-treated with the pigment-dispersing agent of the present invention, described above. The pigment-dispersion paste containing the pigment surface-treated with the pigment-dispersing agent of the present invention can be produced by treating the pigment-dispersion composition of the present invention by a varying pigment disperser. The optimum content of the pigment-dispersing agent depends on the desired particle size of the dispersed pigment. It is incorporated preferably at 0.3 parts by weight or more based on 100 parts by weight of the pigment, in order to sufficiently adsorb the metallic compound serving as the pigment-adsorbing segment on the pigment particle surfaces. At an excessively high content, the metallic compound itself develops a color to affect color phase of the pigment. In consideration of the above, the metallic compound as one of the components of the pigment-dispersing agent contained in the toner is incorporated preferably at 0.01 to 2.5% by weight, more preferably 0.01 to 1.0% by weight, based on the weight of the toner.

The n-electron-donating compound, which is coordinated with the central metal of the metallic compound to provide steric hindrance and thereby to prevent re-agglomeration of the pigment particles with each other, is preferably a polymer in the toner. The polymer preferably has a weight-average molecular weight Mw of 2,000 to 100,000 to produce the dispersion effect while causing no damage on the toner's fixing performance. Increasing content of the n-electron-donating compound is preferable, viewed from efficiency of its coordination with the metallic compound. However, an excessively high content is undesirable in consideration of its effects on the toner properties. Based on these considerations, the n-electron-donating compound is incorporated preferably at 0.05 to 10% by weight based on the weight of the toner.

Moreover, when the pigment dispersion medium is a binder resin for the toner or polymerizable monomer for forming the binder resin of the toner, the n-electron-donating compound preferably has at least one type of the polymerizable monomer unit which constitutes the binder resin and n-electron donative, polymerizable monomer unit, because it produces an excellent pigment dispersion effect by its affinity for the dispersion medium, and keeps the pigment well dispersed in the polymerization step. For example, when the binder resin is a styrene/butyl acrylate copolymer, a styrene/vinyl pyridine copolymer is cited as a preferable polymer serving as the n-electron-donating compound. Moreover, it can bring the n-electron-donating compound's properties close to those of the binder resin, thereby controlling the adverse effects on the toner's properties. Increasing number of the functional groups capable of being coordinated is preferable, viewed from the considerations including coordination efficiency. Based on these considerations, the n-electron-donating compound is preferably a polymer which contains the n-electron donative, polymerizable monomer unit at 0.1 to 30% by weight, more preferably 1.0 to 10% by weight, when it is to be used for toner.

The toner containing the pigment surface-treated with the pigment-dispersing agent of the present invention can be produced by suspension polymerization, where the pigment-dispersion paste containing the pigment-dispersing agent of the present invention is mixed with a polymerizable monomer, polymerization initiator and one or more other additives, and the resultant polymerizable monomer composition is dispersed in an aqueous dispersion medium.

The aqueous dispersion medium useful for the process involving suspension polymerization for production of the toner of the present invention is selected mainly according to the polymerizable monomer used and solubility of the resultant polymer. More specifically, those media useful for the present invention include water; alcohols, e.g., methyl alcohol, ethyl alcohol, modified ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol and cyclohexanol; ether alcohols, e.g., methyl cellosolve, cellosolve, isopropyl cellosolve, butyl cellosolve, diethylene glycol and monobutyl ether; ketones, e.g., acetone, methylethylketone and methylisobutylketone; esters, e.g., ethyl acetate, butyl acetate, ethyl propionate and cellosolve acetate; hydrocarbons, e.g., hexane, octane, petroleum-derived ether, cyclohexane, benzene, toluene and xylene; halogenated hydrocarbons, e.g., carbon tetrachloride, trichloroethylene and tetrabromoethane; ethers, e.g., ethyl ether, dimethyl glycol and trioxanetetrahydrofuran; acetals, e.g., methylal and diethyl acetal; organic acids, e.g., formic acid, acetic acid and propionic acid; and organic compounds containing sulfur or nitrogen, e.g., nitropropene, nitrobenzene, dimethylamine, monoethanolamine, pyridine, dimethyl sulfoxide and dimethyl formamide. These media may be used either individually or in combination. The polymerizable monomer is incorporated at 1 to 80% by weight, preferably 10 to 65% by weight, based on the weight of the medium.

The dispersion stabilizer for the toner particles, useful for the process involving suspension polymerization for production of the toner of the present invention, may be selected from the known ones. More specifically, these stabilizers include inorganic compounds, e.g., calcium phosphate, magnesium phosphate, aluminum phosphate, zinc phosphate, calcium carbonate, magnesium carbonate, calcium hydroxide, magnesium hydroxide, aluminum hydroxide, calcium metasilicate, calcium sulfate, barium sulfate, bentonite, silica and alumina; and organic compounds, e.g., polyvinyl alcohol, gelatin, methyl cellulose, methylhydroxypropyl cellulose, ethyl cellulose, sodium salt of carboxymethyl cellulose; polyacrylic acid and its salt; and starch. The dispersion stabilizer is incorporated preferably at 0.2 to 20% by weight based on 100% by weight of the polymerizable monomer.

The polymerization initiator used in the process for producing the toner of the present invention may include known polymerization initiators. Stated specifically, it may include azo compounds such as 2,2'-azobisisobutyronitrile, 2,2'-azobis-(2,4-dimethylvaleronitrile), 2,2'-azobis(2-methylbutyronitrile), 1,1'-azobis-(cyclohexane-1-carbonitrile), dimethyl-2,2'-azobisisobutyrate, 4,4'-azobis-4-cyanovaleronitrile and 2,2'-azobis(4-methoxy-2,4-dimethylvaleronitrile); peroxides such as benzoyl peroxide, and methyl ethyl ketone peroxide; nucleophilic reagents such as alkali metals, metal hydroxides and Grignard reagents; and protonic acid, metal halides and stabilized carbonium ions. The polymerization initiator may preferably be in a concentration of from 0.1 to 20% by weight, and more preferably from 0.1 to 10% by weight, based on the weight of the monomer.

In the case when the toner of the present invention is produced by polymerization, a chain transfer agent may be used, which may include known chain transfer agents.

In the present invention, toner additives as shown below may further be used in order to provide the toner with various properties.

In order to stabilize triboelectric charging performance of the toner, a charge control agent may be incorporated in the toner particles. In this case, it is preferable to use a charge control agent having a high toner charging speed and capable of maintaining a constant charge quantity stably. When the polymerization method is used to produce the toner particles, charge control agents having no polymerization inhibitory action are particularly preferred. Stated specifically, as negative charge control agents, preferred are metal compounds of salicylic acid, alkyl salicylic acids, dialkyl salicylic acids, naphthoic acid or dicarboxylic acids, polymer type compounds having sulfonic acid or carboxylic acid in the side chain, boron compounds, urea compounds, silicon compounds and carixarene. As positive charge control agents, preferred are quaternary ammonium salts, polymer type compounds having such a quaternary ammonium salt in the side chain, guanidine compounds, and imidazole compounds. Any of these charge control agents may preferably be added in a amount of from 0.5 to 10 parts by weight based on 100 parts by weight of the binder resin.

Additives such as a fluidity-providing agent, an abrasive, a lubricant and charge controlling particles may also externally be added to the toner particles.

As the fluidity-providing agent, metal oxides such as silicon oxide, aluminum oxide and titanium oxide may preferably be used. These may more preferably be those having been subjected to hydrophobic treatment. As the abrasive, metal oxides such as cerium oxide, aluminum oxide, magnesium oxide and chromium oxide, nitrides such as silicon nitride, carbides such as silicon carbide, and metal salts such as strontium titanate, calcium sulfate, barium sulfate and calcium carbonate may preferably be used. As the lubricant, fluorine resin powders such as vinylidene fluoride and polytetrafluoroethylene, and fatty acid metal salts such as zinc stearate and calcium stearate may preferably be used. As the charge controlling particles, metal oxides such as tin oxide, titanium oxide, zinc oxide, silicon oxide and aluminum oxide, and carbon black may preferably be used.

Any of these external additives may be used in an amount of from 0.1 part to 10 parts by weight, and preferably from 0.1 part to 5 parts by weight, based on 100 parts by weight of the toner particles. These additives may be used alone or in combination of two or more types.

The toner of the present invention may be used as an one-component developer, or may be blended with a carrier so as to be used as a two-component developer.

The measuring method of triboelectric charge quantity of the toner by means of blow-off method used in the present invention is described below.

The toner and the carrier are placed in 100 ml container made of polyethylene and are blended in a suitable blend quantity (2 to 15% by weight) when made into a developer, and are blended with a Turbula mixer for 180 seconds. This blended powder (developer) is put in a container made of a metal at the bottom of which a conductive screen of 635 meshes is provided, and then sucked by means of a suction device. The triboelectric charge quantity of the toner is determined from the difference in weight before and after the suction and from the potential accumulated in a capacitor connected to the container. Here, suction pressure is set at 250 mmHg. By this method, the triboelectric charge quantity (Q) is calculated according to the following expression.

$$Q(\mu C/g) = (C \times V)/(W1 - W2)$$

wherein W1 is the weight before suction, W2 is the weight after suction, C is the capacity of the capacitor, and V is the potential accumulated in the capacitor.

EXAMPLES

The present invention is described below by giving Examples. The present invention is by no means limited by these Examples. In the following, "part(s)" used in Examples all indicates "part(s) by weight."

n-electron-donating Compound Production Example 1

Styrene-(4-vinyl pyridine)copolymer (Copolymer A) was synthesized by the following procedure.

Two hundred and fifty milliliters of tetrahydrofuran was charged in a 1-liter reactor vessel, and kept at 68° C. Next, a mixed solution of 70 g of styrene, 3 g of 4-vinyl pyridine, 6.15 g of 2,2-azoisobutylonitrile and 80 ml of tetrahydrofuran was prepared and charged dropwise in the reactor vessel over 2 hours. Then, the mixture was kept at 68° C. for 4 hours under reflux and cooled to room temperature, to which 1 liter of methanol was added. The precipitated crystal was filtered off and washed with methanol and then with water. The resultant powder was dried at 30° C. under a vacuum for 24 hours to prepare 16.3 g of Copolymer A. It was found to have a styrene/4-vinyl pyridine copolymer ratio of 96/4 by weight, and a number-average molecular weight (Mn) of 2,040 and weight-average molecular weight (Mw) of 4,470, determined by the IR spectral analysis, elementary analysis and molecular weight analysis.

n-electron-donating Compound Production Example 2

Styrene-(4-vinyl pyridine)copolymer (Copolymer B) was synthesized by the following procedure.

Sixty-two grams of Copolymer B was prepared in the same manner as in n-electron-donating compound Production Example 1, except that the quantity of the 4-vinyl pyridine was reduced from 3 g to 1.5 g. Copolymer B was found to have a styrene/4-vinyl pyridine copolymer ratio of 98/2 by weight, and a number-average molecular weight (Mn) of 2,340 and weight-average molecular weight (Mw) of 5,470, determined by the IR spectral analysis, elementary analysis and molecular weight analysis.

n-electron-donating Compound Production Example 3

Styrene-(4-acryloylmorpholine)copolymer was synthesized by the following procedure.

Fifty-six and a half grams of styrene-(4-acryloylmorpholine) copolymer was prepared in the same manner as in n-electron-donating compound Production Example 1, except that 3 g of 4-vinyl pyridine was replaced by 1.5 g of 4-acryloylmorpholine. The styrene-(4-acryloylmorpholine) copolymer was found to have a styrene/4-acryloylmorpholine copolymer ratio of 98/2 by weight, and a number-average molecular weight (Mn) of 2,170 and weight-average molecular weight (Mw) of 5,360, determined by the IR spectral analysis, elementary analysis and molecular weight analysis.

n-electron-donating Compound Production Example 4

(2-hydroxyethyl methacrylate)-(4-vinyl pyridine) copolymer was synthesized by the following procedure.

Two hundred and fifty milliliters of tetrahydrofuran was charged in a 1-liter reactor vessel, and kept at 68° C. Next, a mixed solution of 70 g of 2-hydroxyethyl methacrylate, 1.5 g of 4-vinyl pyridine, 6.15 g of 2,2-azoisobutylonitrile and 80 ml of tetrahydrofuran was prepared, and charged dropwise in the reactor vessel in 2 hours. Then, the mixture was kept at 68° C. for 4 hours under reflux, and cooled to room temperature, to which 1 L of water was added. The precipitated crystal was filtered off, and washed with water. The resultant powder was dried at 30° C. under a vacuum for 24 hours, to prepare 48.3 g of (2-hydroxyethyl methacrylate)-(4-vinyl pyridine) copolymer. The copolymer was found to have a 2-hydroxyethyl methacrylate/4-vinyl pyridine copolymer ratio of 98/2 by weight, and a number-average molecular weight (Mn) of 2,620 and weight-average molecular weight (Mw) of 5,630, determined by the IR spectral analysis, elementary analysis and molecular weight analysis.

Example 1

| | |
|---|---|
| Zinc phthalocyanine | 0.225 part |
| Styrene-(4-vinylpyridine) copolymer A | 2.25 parts |
| Styrene monomer | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion paste (a). The pigment-dispersion paste (a) thus obtained was uniformly coated on a glass plate using a wire bar. The coating formed was naturally dried and thereafter its glossiness was measured with a glossmeter (incident angle: 75°; PG-3D, manufactured by Nippon Denshoku K.K.) to find that it was 112, showing a good smoothness. Also, a coating formed on aluminum foil in the same way was observed by scanning electron microscopy (SEM) to find that the pigment was about 50 nm in particle diameter and stood finely uniformly dispersed.

Then, 500 parts of water and 3 parts of polyvinyl alcohol were mixed in a 3-liter flask (with a stirring blade and a condenser tube) and dissolved to prepare water medium. To the solution formed, 100 parts of pigment-dispersion paste (a) and 2 parts of 2,2'-azobisisobutyronitrile were mixed, followed by suspension granulation by means of an ultrasonic homogenizer. Further, polymerization reaction was carried out at 80° C. for 20 hours with stirring. The polymer obtained was collected by filtration and then washed well with water, followed by drying under reduced pressure at 60° C. for 24 hours to obtain color resin particles. The surface of the color resin particles thus obtained were observed by SEM. As the result, any floating of pigment particles was hardly seen on the toner particle surfaces.

Example 2

| | |
|---|---|
| Zinc phthalocyanine | 0.18 part |
| Styrene-(4-vinylpyridine) copolymer B | 1.8 parts |
| Styrene | 100 parts |
| Carbon Black | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion paste (b). The pigment-dispersion paste (b) thus obtained was uniformly coated on a glass plate using a wire bar. The coating formed was naturally dried and thereafter its glossiness was measured to find that it was 134, showing a good smoothness. Also, a coating formed on aluminum foil in the same way was observed by SEM to find that the pigment was about 50 nm in particle diameter and stood finely uniformly dispersed.

Then, 500 parts of water and 3 parts of polyvinyl alcohol were mixed in a 3-liter flask (with a stirring blade and a condenser tube) and dissolved to prepare water medium. To the solution formed, 100 parts of pigment-dispersion paste (b) and 2 parts of 2,2'-azobisisobutyronitrile were mixed, followed by suspension granulation by means of an ultrasonic homogenizer. Further, polymerization reaction was carried out at 80° C. for 20 hours with stirring. The polymer obtained was collected by filtration and then washed well with water, followed by drying under reduced pressure at 60° C. for 24 hours to obtain color resin particles. The color resin particles thus obtained were observed by SEM. As the result, any floating of pigment particles were hardly seen on the toner particle surfaces.

Example 3

A pigment-dispersion paste (c) was prepared in the same manner as in Example 1 except for changing 0.225 part of zinc phthalocyanine used to 0.225 part of zinc (5,10,15,20-tetraphenyl-21H, 23H-porphine) (Zn TPP).

The pigment-dispersion paste (c) thus obtained was uniformly coated on a glass plate using a wire bar. The coating formed was naturally dried and thereafter its glossiness was measured to find that it was 110, showing a good smoothness. Also, a coating formed on aluminum foil in the same way was observed by SEM to find that the pigment was about 50 nm in particle diameter and stood finely uniformly dispersed.

Then, 500 parts of water and 3 parts of polyvinyl alcohol were mixed in a 3-liter flask (with a stirring blade and a condenser tube) and dissolved to prepare water medium. To the solution formed, 100 parts of pigment-dispersion paste (c) and 2 parts of 2,2'-azobisisobutyronitrile were mixed, followed by suspension granulation by means of an ultrasonic homogenizer. Further, polymerization reaction was carried out at 80° C. for 20 hours with stirring. The polymer obtained was collected by filtration and then washed well with water, followed by drying under reduced pressure at 60° C. for 24 hours to obtain color resin particles. The color resin particles thus obtained were observed by SEM. As the result, any floating of pigment particles was hardly seen on the toner particle surfaces.

Example 4

A pigment-dispersion paste (d) was prepared in the same manner as in Example 2 except for changing 0.18 part of zinc phthalocyanine used to 0.18 part of Zn TPP. The pigment-dispersion paste (d) thus obtained was uniformly coated on a glass plate using a wire bar. The coating formed was naturally dried and thereafter its glossiness was measured to find that it was 131, showing a good smoothness. Also, a coating formed on aluminum foil in the same way was observed by SEM to find that the pigment was about 50 nm in particle diameter and stood finely uniformly dispersed.

Then, 500 parts of water and 3 parts of polyvinyl alcohol were mixed in a 3-liter flask (with a stirring blade and a condenser tube) and dissolved to prepare water medium. To the solution formed, 100 parts of pigment-dispersion paste (d) and 2 parts of 2,2'-azobisisobutyronitrile were mixed, followed by suspension granulation by means of an ultrasonic homogenizer. Further, polymerization reaction was carried out at 80° C. for 20 hours with stirring. The polymer obtained was collected by filtration and then washed well with water, followed by drying under reduced pressure at 60° C. for 24 hours to obtain color resin particles. The color resin particles thus obtained were observed by SEM. As the result, any floating of pigment particles was hardly seen on the toner particle surfaces.

Example 5

A pigment-dispersion paste (e) was prepared in the same manner as in Example 2 except for changing 1.8 parts of styrene-(4-vinylpyridine) copolymer B used to 1.8 parts of styrene-(4-acryloylmorpholine) copolymer.

The pigment-dispersion paste (e) thus obtained was uniformly coated on a glass plate using a wire bar. The coating formed was naturally dried and thereafter its glossiness was measured to find that it was 132, showing a good smoothness. Also, a coating formed on aluminum foil in the same way was observed by SEM to find that the pigment was about 50 nm in particle diameter and stood finely uniformly dispersed.

Then, 500 parts of water and 3 parts of polyvinyl alcohol were mixed in a 3-liter flask (with a stirring blade and a condenser tube) and dissolved to prepare water medium. To the solution formed, 100 parts of pigment-dispersion paste (e) and 2 parts of 2,2'-azobisisobutyronitrile were mixed, followed by suspension granulation by means of an ultrasonic homogenizer. Further, polymerization reaction was carried out at 80° C. for 20 hours with stirring. The polymer obtained was collected by filtration and then washed well with water, followed by drying under reduced pressure at 60° C. for 24 hours to obtain color resin particles. The color resin particles thus obtained were observed by SEM. As the result, any floating of pigment particles were hardly seen on the toner particle surfaces.

Example 6

| | |
|---|---|
| Zinc phthalocyanine | 0.5 part |
| Styrene-(4-vinylpyridine) copolymer A | 10 parts |
| Styrene-butylacrylate-divinylbenzene (monomer polymerization weight ratio 80.0/19.0/1.0; Weight average molecular weight: 30,000) | 100 parts |
| Carbon Black | 20 parts |

The above materials were well mixed by means of a Henschel mixer (FM-75 type; manufactured by Mitsui Miike Engineering Corporation). Thereafter, the mixture obtained was kneaded by means of a twin-screw kneader (PCM-30 type; manufactured by Ikegai Tekko Corporation) set at 150° C. The kneaded product obtained was cooled, and then crushed using a hammer mill to obtain coarse pulverized particles of particle diameter of not more than 1 mm. Ultra-thin slices of the coarse pulverized particles obtained were observed by transmission electron microscopy (TEM) to find that the pigment particles with about 50 nm in particle diameter stood finely uniformly dispersed.

Example 7

| | |
|---|---|
| Zinc phthalocyanine | 0.3 part |
| (2-Hydroxyethylmethacrylate)-(4-vinylpyridine) copolymer | 5 parts |
| Methanol | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion paste (f). The pigment-dispersion paste (f) thus obtained was uniformly coated on a glass plate using a wire bar. The coating formed was naturally dried and thereafter its glossiness was measured with a glossmeter (incident angle: 75°; PG-3D, manufactured by Nippon Denshoku K.K.) to find that it was 106, showing a good smoothness. Also, a coating formed on aluminum foil in the same way was observed by scanning electron microscopy (SEM) to find that the pigment was about 50 nm in particle diameter and stood finely uniformly dispersed.

Comparative Example 1

| | |
|---|---|
| Styrene | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion paste (g). The pigment-dispersion paste (g) thus obtained was uniformly coated on a glass plate using a wire bar. The coating formed was naturally dried and thereafter its glossiness was measured by means of the same procedure of Example 1 to find that it was 72, showing a poor smoothness. Also, a coating formed on aluminum foil in the same way was observed by SEM to find that pigment particles were constituted of a mixture of i) particles of about 50 nm in diameter which were considered to be primary particles and ii) coarse particles of 100 to 200 nm in diameter as agglomerates of the primary particles.

Comparative Example 2

| | |
|---|---|
| Zinc phthalocyanine | 0.225 part |
| Styrene | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion paste (h). The pigment-dispersion paste (h) thus obtained was uniformly coated on a glass plate using a wire bar. The coating formed was naturally dried and thereafter its glossiness was measured by means of the same procedure of Example 1 to find that it was 74, showing a poor smoothness. Also, a coating formed on aluminum foil in the same way was observed by SEM to find that pigment particles were constituted of a mixture of i) particles of about 50 nm in diameter which were considered to be primary particles and ii) coarse particles of 100 to 200 nm in diameter as agglomerates of the primary particles.

Comparative Example 3

| | |
|---|---|
| Pigment-dispersing agent (SOLSPERSE 5000 (available from ABISHIA Co.)) | 0.5 part |
| Pigment-dispersing agent (SOLSPERSE 17000 (available from ABISHIA Co.)) | 2 parts |
| Styrene | 100 parts |
| Copper phthalocyanine pigment (Pigment Blue 15:3) | 15 parts |
| Glass beads (diameter: 1 mm) | 150 parts |

The above materials were mixed in a glass bottle, followed by shaking for 10 hours by means of a paint shaker with air-cooling. Thereafter, the glass beads were removed with a nylon mesh to obtain a pigment-dispersion paste (i). The pigment-dispersion paste (i) thus obtained was uniformly coated on a glass plate using a wire bar. The coating formed was naturally dried and thereafter its glossiness was measured by means of the same procedure of Example 1 to find that it was 115, showing a good smoothness. Also, a coating formed on aluminum foil in the same way was observed by SEM to find that the pigment was about 50 nm in particle diameter and stood finely uniformly dispersed.

Then, 500 parts of water and 3 parts of polyvinyl alcohol were mixed in a 3-liter flask (with a stirring blade and a condenser tube) and dissolved, and the pH of the mixture formed was adjusted to 9. To the solution formed, 100 parts of pigment-dispersion paste (i) and 2 parts of 2,2'- azobisisobutyronitrile were mixed, followed by suspension emulsification and polymerization reaction in the same manner as in Example 1. The polymer obtained was collected by filtration and then washed well with water, followed by drying to obtain toner particles. The toner particles thus obtained were observed by SEM. As the result, many pigment particles were seen present at the toner particle surfaces. Ultra-thin slices of particles were also observed by transmission electron microscopy (TEM) to find that the pigment stood dispersed in their interiors but agglomerate layers of the pigment were present about the particle surfaces.

Example 8

Pigment-dispersion Composition (Paste) (j)

Preparation Example

| | |
|---|---|
| Styrene monomer | 340 parts |
| Zinc phthalocyanine | 0.3 part |
| Styrene-(4-vinylpyridine) copolymer A | 3 parts |
| Copper phthalocyanine (Pigment Blue 15:3) | 20 parts |

The above materials were well premixed in a container. Thereafter, keeping the resultant mixture at 20° C. or below, this was dispersed for about 4 hours by means of a bead mill to prepare a pigment-dispersion composition (paste) (j). The pigment-dispersion paste (j) thus obtained was uniformly coated on a glass plate using a wire bar. The coating formed was naturally dried and thereafter its glossiness was measured by means of the same procedure of Example 1 to find that it was 113, showing a good smoothness. Also, a coating formed on aluminum foil in the same way was observed by SEM to find that the pigment was about 50 nm in particle diameter and stood finely uniformly dispersed.

Toner Particles 1 Preparation Example

Into 710 parts of ion-exchanged water, 450 parts of an aqueous 0.1M-Na$_3$PO$_4$ solution was introduced, and the mixture obtained was heated to 60° C., followed by stirring at 11,000 rpm by means of TK-type homomixer (manufactured by Tokushu Kika Kogyo). Then, 70 parts of an aqueous 1.0M-CaCl$_2$ solution was slowly added thereto to obtain an aqueous dispersion medium containing Ca$_3$(PO$_4$)$_2$.

| | |
|---|---|
| Pigment-dispersion paste (j) | 182 parts |
| 2-Ethylhexyl acrylate | 30 parts |
| Paraffin wax (m.p.: 75° C.) | 60 parts |
| Styrene-methacrylic acid-methyl methacrylate copolymer | 5 parts |
| Di-tert-butylsalicylic acid metal compound | 3 parts |

The above materials were heated to 60° C., and dissolved and dispersed to form a monomer mixture. Keeping the resultant mixture at 60° C., 10 parts by weight of a polymerization initiator 2,2'-azobisisobutyronitrile was further added and dissolved to prepare a polymerizable monomer composition. This polymerizable monomer composition was introduced into the aqueous dispersion medium prepared in a 2-liter flask of the above homomixer. These were then stirred at 10,000 rpm for 20 minutes by means of the TK-type homomixer at 60° C. in an atmosphere of nitrogen to granulate the polymerizable monomer composition in the aqueous dispersion medium. Thereafter, reaction was carried out at 60° C. for 3 hours with stirring using a paddle stirring blade, and thereafter polymerization was carried out at 80° C. for 10 hours. After the polymerization was completed, the reaction product was cooled, and hydrochloric acid was added to dissolve the Ca$_3$(PO$_4$)$_2$, followed by filtration, water washing, and then drying to obtain cyan-color polymerization toner particles 1.

Evaluation of Toner Particles 1 Prepared

The particle diameter of the toner particles 1 obtained was measured with a Coulter counter to reveal that the toner particles 1 had a weight average particle diameter of 8.0 μm. Toner particle surfaces were observed by scanning electron microscopy (SEM). As the result, any pigment particles were not observable. Cross sections of the toner particles 1 were further observed by transmission electron microscopy (TEM) according to the dyed ultra-thin slice method to ascertain that the particles each stood separated into a shell composed chiefly of styrene-acrylic copolymer and a core composed chiefly of wax, to have a capsule structure. It was also ascertained that pigment particles of about 50 nm in diameter were finely dispersed in the styrene-acrylic copolymer layer.

Preparation Example and Evaluation of Developer 1

To 100 parts of the toner particles 1 obtained, 0.7 part of hydrophobic fine silica powder having a specific surface area of 200 m$^2$/g as measured by the BET method was externally added to obtain a toner 1. Then, 7 parts of the resultant toner 1 and 93 parts of a ferrite carrier having been surface-coated with a styrene-methyl methacrylate copolymer and having an average particle diameter of 45 μm were blended to obtain a developer 1. Sampling 1 g of the developer 1 thus obtained, the triboelectric charge quantity of the toner was measured by the blow-off method to find that it was −19.2 μC/g.

A full-color copying machine CLC-500, manufactured by CANON INC. was modified to have the developing device and photosensitive drum set apart at 400 μm; developing sleeve and photosensitive drum running in a circumferential speed ratio of 1.3:1; developing device working at a magnetic field intensity of 1,000 oersted around the electrode, alternating electrical field of 2,000 Vpp and frequency of 3,000 Hz; and developing sleeve and photosensitive drum set apart at 500 μm, as described in the specification of Japanese Patent Application Laid-Open No. 6-301242.

Using this developer 1, image reproduction was tested on the remodeled machine. Development was made under conditions of an environment of temperature 23° C./humidity 60% RH and a development contrast of 300 V. The images obtained were in an appropriate toner laid-on quantity, in a high density and in a good fine-line reproduction, thus high-quality images were obtained. The like evaluation was also made in an environment of low temperature and low humidity (15° C./15% RH) and an environment of high temperature and high humidity (30° C./75% RH). As the result, in every environment any fog did not occur and changes in image density were small, thus the toner proved to have a good charging performance. Also, images were reproduced on OHP sheets in the same way and were projected on a screen, using an OHP (overhead projector). As the result, highly transparent cyan-color projected images were obtained.

Example 9

Pigment-dispersion Composition (Paste) (k)

Preparation Example

| | |
|---|---|
| Styrene monomer | 320 parts |
| n-Butyl acrylate | 80 parts |
| Zinc phthalocyanine | 0.24 part |
| Styrene-(4-vinylpyridine) copolymer B | 2.4 parts |
| Carbon Black | 20 parts |

The above materials were well premixed in a container. Thereafter, keeping the resultant mixture at 20° C. or below, this was dispersed for about 4 hours by means of a bead mill to prepare a pigment-dispersion paste (k).

The glossiness of the pigment-dispersion paste (k) thus obtained was measured by means of the same procedure of Example 1 to find that it was 135, showing a good smoothness. Also, a coating formed on aluminum foil in the same way as in Example 8 was observed by SEM to find that the pigment was about 50 nm in particle diameter and stood finely uniformly dispersed.

Toner Particles 2 Preparation Example

An aqueous dispersion medium containing $Ca_3(PO_4)_2$ was obtained in the same manner as in Example 8.

| | |
|---|---|
| Pigment-dispersion paste (k) | 212 parts |
| Paraffin wax (m.p.: 75° C.) | 60 parts |
| Styrene-methacrylic acid copolymer (95:5; Mw: 50,000) | 5 parts |
| Di-tert-butylsalicylic acid metal compound | 3 parts |

The above materials were heated to 60° C., and dissolved and dispersed to form a polymerizable monomer mixture. Subsequently, in the same manner as in Example 8, a polymerization initiator was added and granulation and polymerization were carried out, followed by filtration, washing, and then drying in the same manner as in Example 8 to obtain a polymerization toner particles 2.

Evaluation of Toner Particles 2 Prepared

The particle diameter of the toner particles 2 obtained was measured with a Coulter counter to reveal that the toner particles 2 had a weight average particle diameter of 8.2 μm. Toner particle surfaces were observed by SEM in the same manner as in Example 8. As the result, any pigment particles were not observable like those in Example 8. Cross sections of the toner particles 2 were further observed by TEM in the same manner as in Example 8 to ascertain that the particles had the same capsule structure as those in Example 8, and also to ascertain that pigment particles of about 50 nm in diameter were uniformally finely dispersed in the styrene-acrylic resin layer.

Preparation Example and Evaluation of Developer 2

A developer 2 was prepared in the same manner as in Example 8, where the triboelectric charge quantity of the toner was found to be −25.8 μC/g. Using this developer 2, image reproduction was tested in the same manner as in Example 8 on the remodeled machine of a full-color copying machine CLC-500, manufactured by CANON INC. The images obtained were in an appropriate toner laid-on quantity, in a high density and in a good fine-line reproduction, thus high-quality images were obtained. The like evaluation was also made in an environment of low temperature and low humidity (15° C./15% RH) and an environment of high temperature and high humidity (30° C./75% RH). As the result, in every environment any fog did not occur, thus the toner proved to have a good charging performance.

Comparative Example 4

Pigment-dispersion Composition (Paste) (I)

Preparation Example

| | |
|---|---|
| Styrene monomer | 320 parts |
| n-Butyl acrylate | 80 parts |
| Copper phthalocyanine (Pigment Blue 15:3) | 20 parts |

The above materials were well premixed in a container. Thereafter, keeping the resultant mixture at 20° C. or below, this was dispersed for about 4 hours by means of a bead mill to prepare a pigment-dispersion composition (paste) (I).

The glossiness of the pigment-dispersion paste (I) thus obtained was measured in the same manner as in Example 1 to find that it was 68, and no smoothness was achievable. Also, a coating formed on aluminum foil in the same way as in Example 8 was observed by SEM to find that coarse particles of about 200 nm in diameter and up to fine particles of about 50 nm in diameter were present, showing a great scattering of particle size distribution because of agglomeration of the pigment.

Toner Particles 3 Preparation Example

An aqueous dispersion medium containing $Ca_3(PO_4)_2$ was obtained in the same manner as in Example 8.

| | |
|---|---|
| Pigment-dispersion paste (I) | 212 parts |
| Paraffin wax (m.p.: 75° C.) | 60 parts |
| Styrene-methacrylic acid copolymer (95:5; Mw: 50,000) | 5 parts |
| Di-tert-butylsalicylic acid metal compound | 3 parts |

The above materials were heated to 60° C., and dissolved and dispersed to prepare a polymerizable monomer mixture. Subsequently, in the same manner as in Example 8, a polymerization initiator was added and granulation and polymerization were carried out, followed by filtration, washing, and then drying to obtain a polymerization toner particles 3.

Evaluation of Toner Particles 3 Prepared

The particle diameter of the toner particles 3 obtained was measured with a Coulter counter to reveal that the toner particles had a weight average particle diameter of 8.2 μm. Toner particle surfaces were observed by SEM in the same manner as in Example 8. As the result, any pigment particles were not observable like those in Example 8. Cross sections of the toner particles 3 were further observed by TEM in the same manner as in Example 8 to ascertain that the particles had the same capsule structure as those in Example 8 except that acicular pigment particles of about 50 to 200 nm in diameter were dispersed in the styrene-acrylic resin layer. Also, many pigment particles were seen to be deposited at the boundaries between the wax and the styrene-acrylic resin.

Preparation Example and Evaluation of Developer 3

A developer 3 was prepared in the same manner as in Example 8, where the triboelectric charge quantity of the toner was found to be −21.4 μC/g. Using this developer 3, image reproduction was tested in the same manner as in Example 8 on the remodeled machine of a full-color copying machine CLC-500, manufactured by CANON INC. The images obtained were in an appropriate toner laid-on quantity and in a good fine-line reproduction. In the evaluation also made in an environment of low temperature and low humidity (15° C./15% RH) and an environment of high temperature and high humidity (30° C./75% RH), any fog did not occur in every environment, thus the toner proved to have a good charging performance. However, when images were reproduced on OHP sheets in the same way and were projected using an OHP, projected images having a transparency slightly inferior to those in Example 8 were formed, and chroma was not so high as that in Example 8.

Comparative Example 5

Pigment-dispersion Composition (Paste) (m)

Preparation Example

| | |
|---|---|
| SOLSPERSE 5000 (available from ABISHIA Co.) | 0.5 part |
| SOLSPERSE 17000 (available from ABISHIA Co.) | 2 parts |
| Styrene monomer | 320 parts |
| n-Butyl acrylate | 80 parts |
| Copper phthalocyanine (Pigment Blue 15:3) | 20 parts |

The above materials were well premixed in a container. Thereafter, keeping the resultant mixture at 20° C. or below, this was dispersed for about 4 hours by means of a bead mill to prepare a pigment-dispersion composition (paste) (m).

The glossiness of the pigment-dispersion paste (m) thus obtained was measured in the same manner as in Example 1 to find that it was 114, showing a good smoothness. Also, a coating formed on aluminum foil in the same way as in Example 8 was observed by SEM to find that the pigment was about 50 nm in particle diameter and stood finely uniformly dispersed.

Toner Particles 4 Preparation Example

An aqueous dispersion medium containing $Ca_3(PO_4)_2$ was obtained in the same manner as in Example 8.

| | |
|---|---|
| Pigment-dispersion paste (m) | 212 parts |
| Paraffin wax (m.p.: 75° C.) | 60 parts |
| Styrene-methacrylic acid copolymer (95:5; Mw: 50,000) | 5 parts |
| Di-tert-butylsalicylic acid metal compound | 3 parts |

The above materials were heated to 60° C., and dissolved and dispersed to prepare a polymerizable monomer mixture. Subsequently, in the same manner as in Example 8, a polymerization initiator was added and granulation and polymerization were carried out, followed by filtration, washing, and then drying to obtain a polymerization toner particles 4.

Evaluation of Toner Particles 4 Prepared

The particle diameter of the toner particles 4 obtained was measured with a Coulter counter to reveal that the toner had a weight average particle diameter of 8.0 μm. Toner particle surfaces were observed by SEM in the same manner as in Example 8. As the result, many pigment particles having a particle diameter of about 50 nm were observed. Cross sections of the toner particles 4 were further observed by TEM in the same manner as in Example 8 to ascertain that pigment particles of about 50 nm in diameter were randomly dispersed in slight coagulation state in the styrene-acrylic resin layer, and to also ascertain that a part of wax was deposited on the toner surface.

Preparation Example and Evaluation of Developer 4

A developer 4 was prepared in the same manner as in Example 8, where the triboelectric charge quantity of the toner was found to be −15.2 μC/g. Using this developer 4, image reproduction was tested in the same manner as in Example 8 on the remodeled machine of a full-color copying machine CLC-500, manufactured by CANON INC. The images obtained were in an appropriate toner laid-on quantity, but fog occurred a little. The same evaluation was carried out in an environment of low temperature and low humidity (15° C./15% RH) and an environment of high temperature and high humidity (30° C./75% RH). As the result, in an environment of high temperature and high humidity (30° C./75% RH), fog was seen to occur greatly, thus it was ascertained that the toner had environmental properties inferior to the developer 1 in Example 8. Meanwhile, in the image reproduction on OHP sheets, as compared with Example 8, slightly dull cyan-color images were obtained.

What is claimed is:

1. A dispersing agent for a pigment comprising at least a metallic compound having a structure represented by the general formula (I):

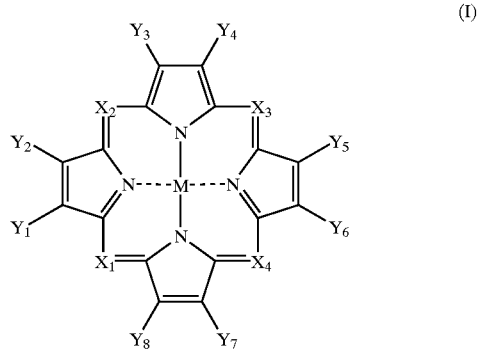

wherein $X_1$ to $X_4$ are each independently a nitrogen atom or C—R wherein R is hydrogen atom, an alkyl group of 1 to 12 carbon atoms, which may have a substituent, or an aromatic hydrocarbon group, which may be substituted; $Y_1$ to $Y_8$ are each independently a hydrogen atom or an alkyl group of 1 to 12 carbon atoms, which may be substituted; or $Y_1$ and $Y_2$, $Y_3$ and $Y_4$, $Y_5$ and $Y_6$ and/or $Y_7$ and $Y_8$ constitute an aromatic hydrocarbon ring which may have a substituent; and M is a metal capable of taking a penta-coordinated structure and an n-electron-donating compound capable of being coordinated with the central metal of the metallic compound.

2. The dispersing agent for a pigment according to claim 1, wherein said metallic compound has a phthalocyanine skeleton wherein $X_1$ to $X_4$ in the general formula (I) are each independently a nitrogen atom, and each of combinations of $Y_1$ and $Y_2$, $Y_3$ and $Y_4$, $Y_5$ and $Y_6$ and/or $Y_7$ and $Y_8$ constitutes an aromatic hydrocarbon ring which may have a substituent.

3. The dispersing agent for a pigment according to claim 1, wherein the central metal in said metallic compound is zinc.

4. The dispersing agent for a pigment according to claim 3, wherein said metallic compound is zinc-phthalocyanine.

5. The dispersing agent for a pigment according to claim 1, wherein said n-electron-donating compound is a molecule, oligomer or polymer having at least one skeleton selected from the group consisting of primary amines, secondary amines, tertiary amines, imines, primary amides, secondary amides, tertiary amides, imides, aromatic imides, thiols, thioesters, thionyls, sulfides and sulfoxides.

6. A pigment-dispersion composition comprising at least a pigment, a dispersion medium, and the dispersing agent for a pigment according to any one of claims 1 to 5.

7. The pigment-dispersion composition according to claim 6, wherein said dispersion medium comprises at least a polymerizable monomer.

8. A toner containing toner particles which comprise at least a binder resin, a pigment, and the dispersing agent for a pigment according to any one of claims 1 to 5.

9. The toner according to claim 8, wherein said toner particles are produced in an aqueous medium.

10. The toner according to claim 9, wherein said toner particles are produced by suspension polymerization.

11. The toner according to claim 8, wherein the metallic compound is contained in an amount of 0.01% by weight to 2.5% by weight based on the weight of the toner.

12. The toner according to claim 8, wherein the n-electron-donating compound has a weight-average molecular weight (Mw) of 2,000 to 100,000.

13. The toner according to claim 8, wherein the n-electron-donating compound is contained in an amount of 0.05% by weight to 10% by weight based on the weight of the toner.

14. The toner according to claim 8, wherein the n-electron-donating compound is a copolymer comprising at least one type of a polymerizable monomer unit from which the polymer constituting said binder resin for the toner is produced and a polymer unit for a polymerizable monomer unit for the n-electron-donating compound.

15. The toner according to claim 8, wherein the n-electron-donating compound is contained in an amount of 0.1% by weight to 30% by weight as the n-electron donative polymerizable monomer unit.

16. A process for producing a toner, comprising a step of mixing a pigment with the dispersing agent for a pigment according to any one of claims 1 to 5.

17. The process for producing a toner according to claim 16, comprising a step of preparing a polymerizable monomer composition containing at least a polymerizable monomer, a pigment and the dispersing agent for a pigment according to any one of claims 1 to 5, and another step of polymerizing the polymerizable monomer in the polymerizable monomer composition to produce toner particles.

18. The process for producing a toner according to claim 17, comprising a step of granulating said polymerizable monomer composition in an aqueous medium, and another step of polymerizing said polymerizable monomer in said polymerizable monomer composition to produce the toner particles.

* * * * *